(12) United States Patent
Yagi

(10) Patent No.: US 7,995,103 B2
(45) Date of Patent: Aug. 9, 2011

(54) IMAGING APPARATUS AND CONTROL METHOD THEREOF, STORAGE MEDIUM AND PROGRAM

(75) Inventor: Hisao Yagi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 11/670,288

(22) Filed: Feb. 1, 2007

(65) Prior Publication Data

US 2007/0188622 A1    Aug. 16, 2007

(30) Foreign Application Priority Data

Feb. 16, 2006  (JP) ................................. 2006-039571

(51) Int. Cl.
*H04N 5/225* (2006.01)
(52) U.S. Cl. .................................................. 348/220.1
(58) Field of Classification Search .............. 348/220.1; 396/436
See application file for complete search history.

(56) References Cited

U.S. PATENT DOCUMENTS

| | | | | |
|---|---|---|---|---|
| 6,519,006 B1* | 2/2003 | Nakamura et al. | ............ | 348/445 |
| 7,432,957 B2* | 10/2008 | Yokoi | ........................ | 348/220.1 |
| 2002/0024602 A1* | 2/2002 | Juen | ............................ | 348/220 |
| 2005/0190202 A1* | 9/2005 | Suzuki et al. | ................. | 345/660 |
| 2005/0190274 A1* | 9/2005 | Yoshikawa et al. | ...... | 348/231.99 |
| 2005/0286780 A1* | 12/2005 | Takahashi et al. | ............ | 382/232 |
| 2006/0132638 A1* | 6/2006 | Saitou | ........................ | 348/333.01 |
| 2006/0203099 A1* | 9/2006 | Omata | ........................ | 348/220.1 |
| 2006/0256203 A1* | 11/2006 | Honma | ........................ | 348/220.1 |

FOREIGN PATENT DOCUMENTS

| JP | 2003219341 A | * | 7/2003 |
|---|---|---|---|
| JP | 2006-033263 A | | 3/2006 |

OTHER PUBLICATIONS

Machine Translation of JP-2003219341-A.*

* cited by examiner

*Primary Examiner* — Sinh Tran
*Assistant Examiner* — Jason A Flohre
(74) *Attorney, Agent, or Firm* — Canon USA, Inc. IP Division

(57) ABSTRACT

An imaging apparatus which can capture a still image while capturing a moving image, can capture images in consideration of the aspect ratio settings of the moving image and the still image. For example, in the case where a user instructs to capture the still image while capturing a moving image, the still image is captured in an aspect ratio of recording the moving image. The captured still image can be used to complement a missing frame of the moving image.

7 Claims, 10 Drawing Sheets

2001

2002

2003

*3001*

4001

4002

4003

5001

6001

6002

6003

901

902

903

904

IMAGING APPARATUS AND CONTROL METHOD THEREOF, STORAGE MEDIUM AND PROGRAM

BACKGROUND OF THE INVENTION

1. Field of the Invention

The present invention relates to an imaging apparatus which can capture a still image while capturing a moving image, control method thereof, storage medium, and program.

2. Description of the Related Art

A digital camera and a digital camcorder use common technologies therein, and there is a digital camera which can capture a moving image as well as a still image. Moreover, there is a digital camera which can capture a still image while capturing a moving image. When such a digital camera captures a still image while capturing a moving image, the digital camera stores the obtained image data separately into a moving image file and into a still image file.

Generally, a moving image is recorded in a VGA size. If a still image is recorded in a VGA size the same as a moving image, a still image can be picked out from a moving image and recorded. However, quality of such a still image recorded in a VGA size is inferior compared to a still image captured by a digital camera.

Consequently, in the case where a digital camera captures a still image while capturing a moving image, the digital camera stops the capturing of a moving image simultaneously as the capturing of a still image is started. The digital camera switches to a high-image quality operation for capturing a still image, and captures a still image. The capturing of the moving image is resumed after the capturing of the still image is finished.

However, in the above-described process, the capturing of a moving image is stopped halfway. As a result, connection between frames of the recorded moving image is partly cut off, and a user watching the reproduced moving image typically will notice such imperfection.

To overcome such a problem, a digital camera inserts a still image into the part of the moving image file where a still image is being captured. For example, a conventional technology complements a missing frame in a moving image which is caused by capturing a still image while capturing a moving image.

Recently, image outputting devices such as a television set can output in both 4:3 and 16:9 aspect ratios. Accordingly, it is desirable that image recording apparatuses such as a digital camera can capture images in both 4:3 and 16:9 aspect ratios.

However, when the aspect ratio is changed from 4:3 to 16:9, the field range of the capturing also changes. For example, in the case where different aspect ratios are set for a still image and a moving image, and a still image is conventionally stored as a frame in a moving image, the aspect ratio of the picture changes in the still image part when the moving image file is reproduced. Therefore, a user typically will notice an imperfection when he watches the reproduced moving image file.

SUMMARY OF THE INVENTION

The present invention is directed to an imaging apparatus which can capture a still image while capturing a moving image.

According to an aspect of the present invention, an imaging apparatus includes a still image aspect ratio setting unit configured to set an aspect ratio of a still image, a still image capturing unit configured to capture a still image according to the set aspect ratio of a still image, a moving image aspect ratio setting unit configured to set an aspect ratio of a moving image, a moving image capturing unit configured to capture a moving image according to the set aspect ratio of a moving image, an instructing unit configured to instruct the capturing of a still image during the capturing of a moving image, and an inserting unit configured to insert a still image in a missing part of a moving image caused by the capturing of the still image according to an instruction of the instructing unit, wherein an aspect ratio of the inserted still image is the set aspect ratio of the moving image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the invention and, together with the description, serve to explain the principles of the invention.

DETAILED DESCRIPTION OF THE EMBODIMENTS

Various exemplary embodiments, features and aspects of the invention will be described in detail below with reference to the drawings.

First Exemplary Embodiment

Figure 1:
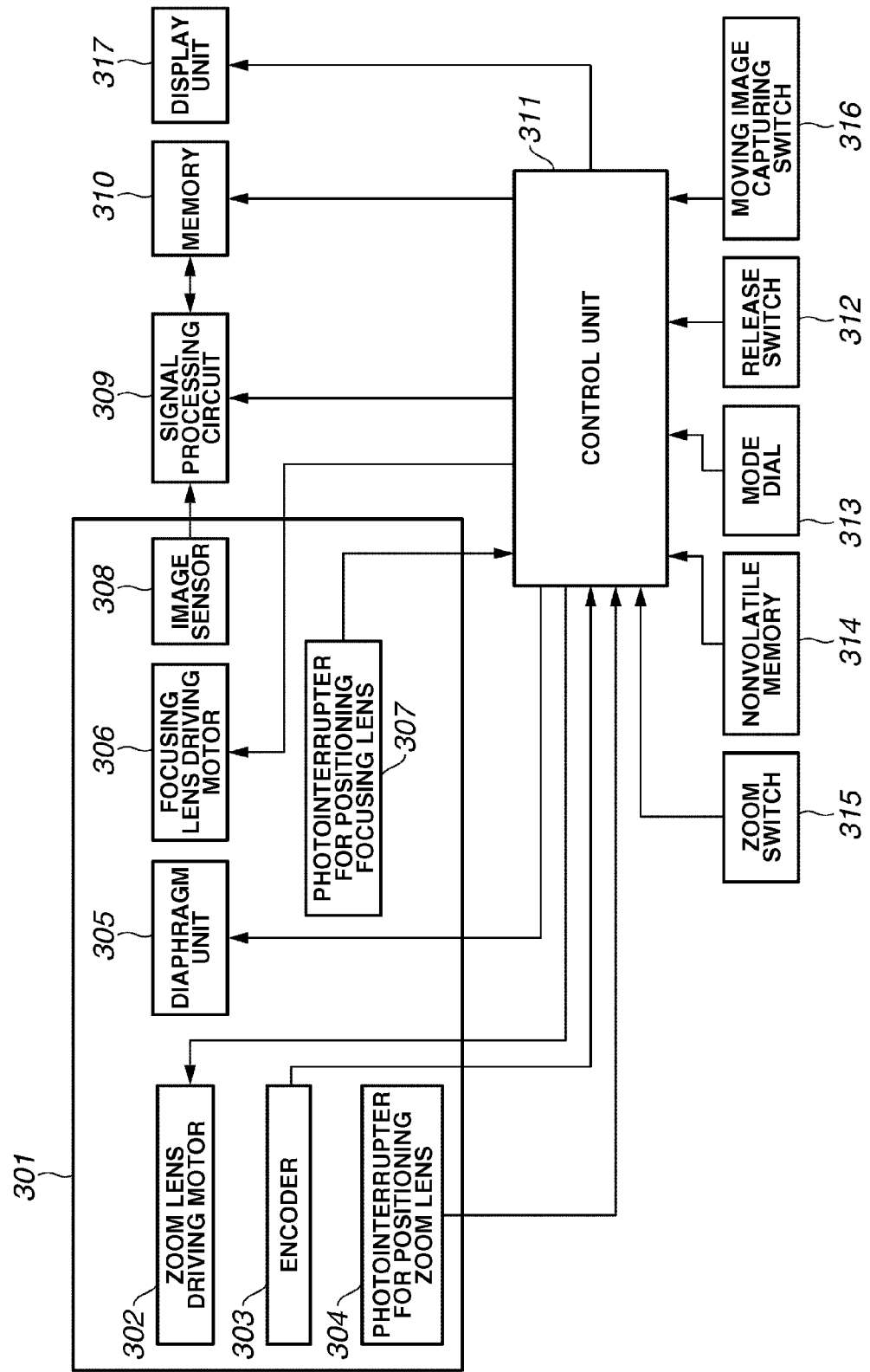
FIG. 1 is a block diagram of an example electrical configuration of an imaging apparatus according to a first exemplary embodiment in the present invention.

FIG. 1 is a block diagram of an electrical configuration of an imaging apparatus according to the first exemplary embodiment in the present invention. A lens barrel unit 301 includes a drive system such as a motor as will be described below. A zoom lens driving motor 302 is used to drive the zoom lens (not shown) for changing the angle of view. A DC motor, a step motor, or an ultrasonic motor which meet the specification required for driving the zoom lens, can be used as the zoom lens driving motor 302.

An encoder 303 is used to detect the position of the zoom lens. A linear sensor or other detection means can also be used for the position detection of the zoom lens. A photointerrupter 304 initializes the position of the zoom lens. A diaphragm unit 305 limits the amount of light entering an image sensor 308 by an instruction from a control unit 311. Thus, the diaphragm unit 305 maintains a photo-taken image at an appropriate exposure level.

A focusing lens driving motor 306 drives the lens (not shown) for focus adjustment (hereinafter referred to as a focusing lens). Since the focusing lens is driven by a motor independent of the zoom lens, the focusing lens can be driven into any position within a range which does not interfer with the zoom lens. A photointerrupter 307 initializes the position of the focusing lens. A subject image transmitted through the zoom lens is focused on the image sensor 308 by the focusing lens.

The image sensor 308 conducts photoelectric conversion. A predetermined process such as color conversion or gamma processing is performed on a converted image signal in a signal processing circuit 309, and the processed signal is recorded in a memory 310 such as a card medium.

The control unit 311 controls the imaging apparatus. The control unit 311 controls the zoom lens driving motor 302, focusing lens driving motor 306, and the diaphragm unit 305 while monitoring the output of the encoder 303 and the photointerrupter 304 in the lens barrel unit. The control unit 311 also controls the signal processing circuit 309 and the memory 310.

A nonvolatile memory 314 such as an EPROM can delete and record data electrically. The nonvolatile memory 314 can store programs to be read and executed by the control unit 311, and parameters for controlling the imaging apparatus.

A mode dial switch 313 sets and switches functional modes such as power off, a capturing mode, a reproducing mode, and a PC connection mode. In addition, an aspect ratio of a moving image or a still image can be set using the mode dial switch 313. A zoom switch 315 is used by a user to switch between zooming in a wide-angle direction and in a telephoto direction.

A release switch 312 is used to instruct capturing of a still image. A moving image capturing switch 316 instructs to start and end capturing of a moving image. In an imaging apparatus having both of the switches 316 and 312, the instructions to start and end capturing of a moving image, and capturing of a still image are clearly separated. Therefore, a still image can be captured while capturing a moving image by operating the release switch 312 while capturing a moving image.

A display unit 317 displays an image formed on the image sensor 308. Examples of the display unit 317 are liquid crystal display and organic electroluminescence display. Since an image formed by the imaging sensor 308 is displayed on the display unit 317 before as well as during the capturing of an image, a user can decide the composition of the picture by viewing the display unit 317.

Figure 2:
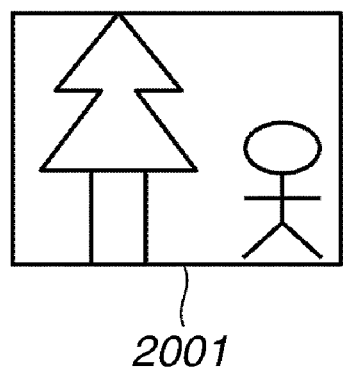
FIG. 2 illustrates a frame of a moving image according to the first exemplary embodiment in the present invention.
Figure 2:
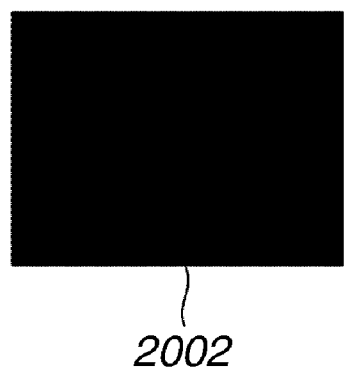
Figure 2:
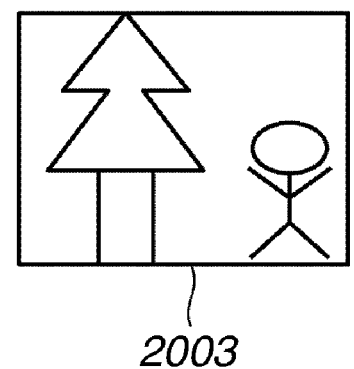

The capturing of a still image while capturing a moving image will be described below. FIG. 2 illustrates frames of a moving image in the case where a still image is captured while capturing a moving image. The figure illustrates continuous frames 2001, 2002, and 2003. The frame 2002 is the frame at which a still image is captured. While capturing the still image, the capturing of the moving image is stopped and a frame is missing so that a blacked out frame is inserted as a substitute frame. When this moving image file is reproduced, a black out image is generated at the frame 2002, which disrupts the continuity of the moving image.

Figure 3:
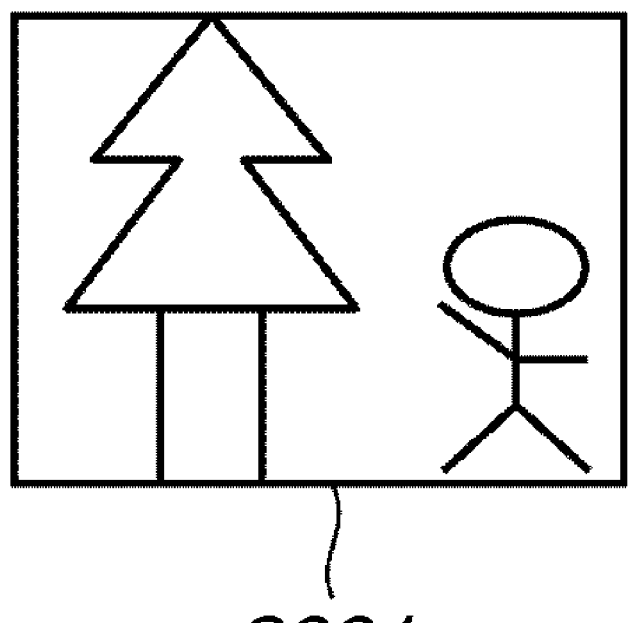
FIG. 3 illustrates a still image of 4:3 aspect ratio according to the first exemplary embodiment in the present invention.

FIG. 3 illustrates a still image captured while capturing a moving image as shown in FIG. 2. A frame 3001 is recorded in the memory 310 as an independent still image file.

Figure 4:
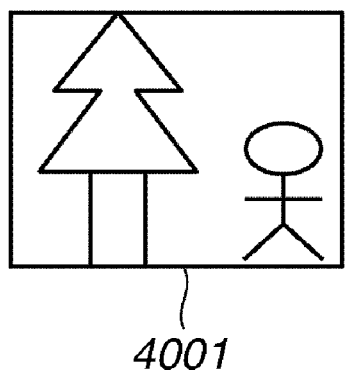
FIG. 4 illustrates a frame of a moving image in which a 4:3 still image is inserted according to the first exemplary embodiment in the present invention.
Figure 4:
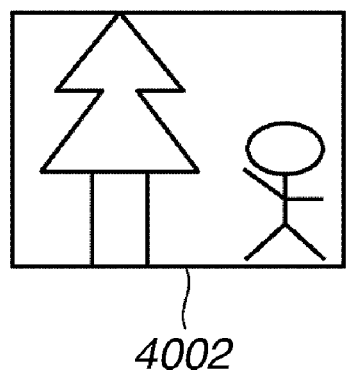
Figure 4:
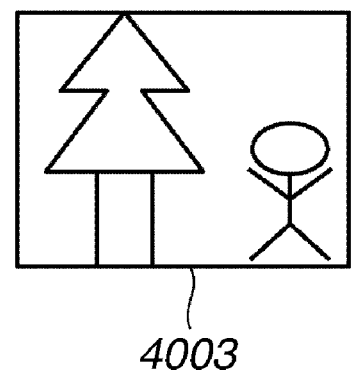

FIG. 4 illustrates frames of a moving image file in which a still image is inserted. Frames 4001 and 4003 are frames of a moving image corresponding to the frames 2001 and 2003 in FIG. 2. Frame 4002 is a frame in which the still image file 3001 is inserted in place of the blacked out frame 2002. In FIG. 4, a still image is inserted into only one frame. However, a plurality of still images can be inserted according to the times the moving image is stopped, and the frame rate of the moving image. In such a case, the same still image can be inserted into a plurality of frames.

As described above, a still image is inserted into the portion of a moving image frames which are stopped from being captured due to the capturing of a still image. As a result, a moving image into which a still image is plugged, is obtained, and a missing moving image can be complemented.

The setting of the capturing condition and the aspect ratio will be described below. A user can set the condition for capturing a still image and a moving image using the mode dial 313. The conditions that can be set include the size of the file to be recorded, the compression ratio of the image, autofocus, exposure control, and white balance. In addition, the aspect ratio of the image can be set. Generally, a moving image is captured setting an aspect ratio for the moving image, and a still image is captured setting an aspect ratio for the still image. The conditions for capturing a still image and a moving image can be set separately by dividing the area of the nonvolatile memory 314. In the present exemplary embodiment, the aspect ratio of an image can be set in either 4:3 or 16:9.

Figure 5:
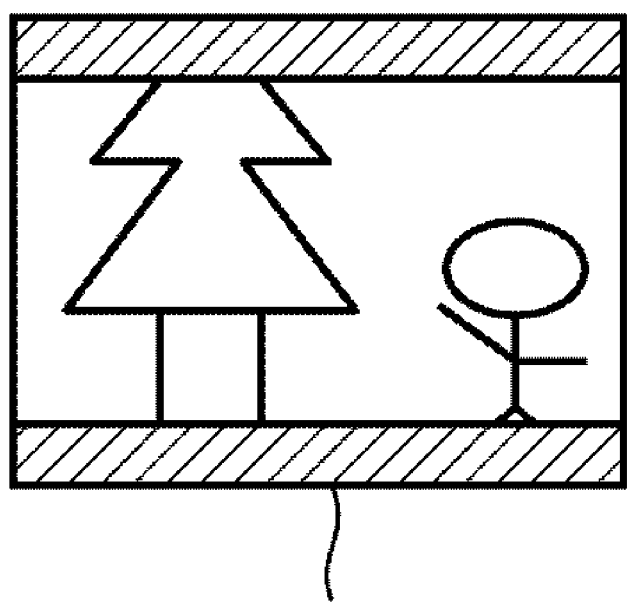
FIG. 5 illustrates a still image of 16:9 aspect ratio according to the first exemplary embodiment in the present invention.

When an aspect ration is set, a captured image can be processed by cutting out an image with the aspect ratio, from an image of the largest aspect ratio of an image sensor. For example, in the case where the largest aspect ratio of an image sensor is 4:3, the image captured in an aspect ratio 4:3 is shown in FIG. 3. To obtain an image of 16:9 aspect ratio in such an image sensor, the imaging apparatus masks the upper part and the lower part of the 4:3 image shown in FIG. 3. Moreover, the aspect ratio can be changed by switching the driving area of the image sensor 308. FIG. 5 illustrates an image 5001 on which a masking process is performed to obtain an image of 16:9 aspect ratio.

A case is now described where different aspect ratios are set to the moving image file for recording a moving image and recording a still image when the capturing of a still image is instructed while capturing a moving image.

Figure 6:
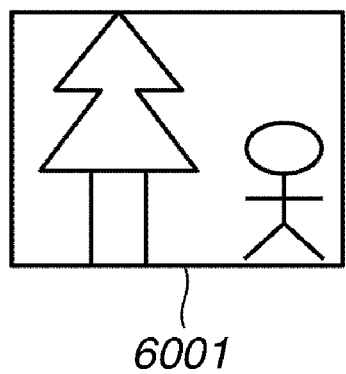
FIG. 6 illustrates a frame of a moving image in which a 16:9 still image is inserted according to the first exemplary embodiment in the present invention.
Figure 6:
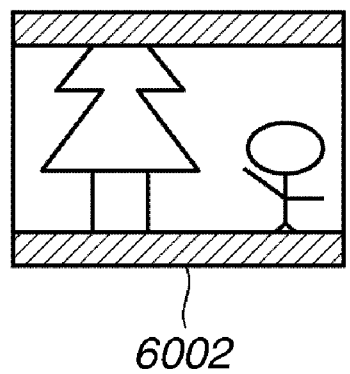
Figure 6:
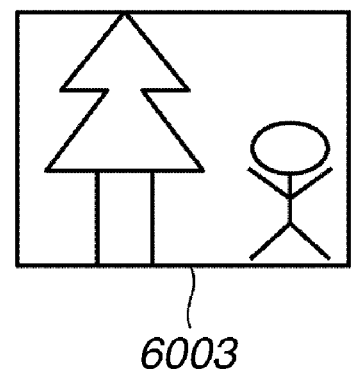

FIG. 6 illustrates an exemplary case where a still image having a different aspect ratio is inserted into the moving image file. Frames 6001 and 6003 correspond to frames 2001 and 2003 shown in FIG. 2. Frame 6002 is a frame in which the still image file 5001 is inserted in place of the blacked out frame 2002.

By inserting a still image as above, a moving image which was missed while capturing a still image can be complemented. However, if a still image of a different aspect ratio is inserted, the aspect ratio where the still image is inserted, will be different from other images when reproducing the moving image. Therefore, a user will feel strange at the sudden change of the aspect ratio when reproducing the moving image.

If different aspect ratios are set for a moving image and a still image, an imaging apparatus in the present exemplary embodiment prevents such a sense of strangeness. Namely, the imaging apparatus captures the still image in the aspect ratio of the moving image when a capturing of a still image is instructed while capturing a moving image.

Figure 7:
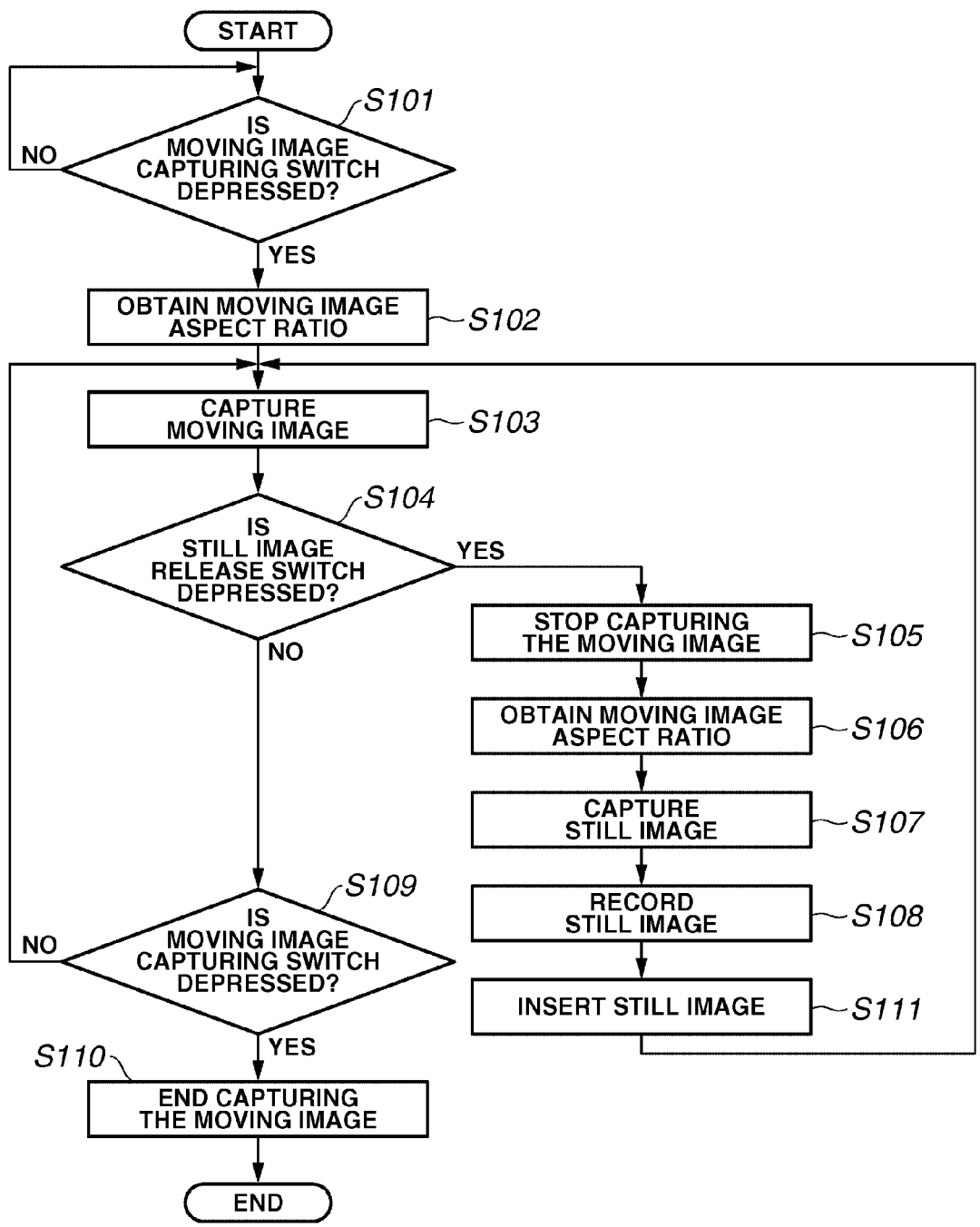
FIG. 7 is a flowchart of an example process according to the first exemplary embodiment in the present invention.

Referring to FIG. 7, an example flow will be described in which an instruction to capture a still image is given while capturing a moving image. A user sets the size of the image to be recorded or the frame rate using the setting menu or the mode dial 313. One of the capturing conditions that can be set at this time, is the aspect ratios of the moving image and the still image. A user can select the aspect ratios separately.

The aspect ratios selected by the user operation are stored in the nonvolatile memory 314. The stored aspect ratios are retained even when the power is turned off, and the same setting is effective when the power is turned on. If it is desirable that the user setting is deleted by turning the power off, the imaging apparatus can store the setting in a memory which deletes such setting when the power is turned off, instead of a nonvolatile memory.

When a user wants to record a moving image, the user depresses the moving image capturing switch 316 to start capturing. Upon detecting that the switch for capturing a moving image 316 is depressed (step S101), the control unit 311 starts capturing a moving image. The control unit 311 obtains the aspect ratio of the moving image from the nonvolatile memory 314 (step S102) and captures the moving image setting the obtained aspect ratio (step S103). The image taken by the image sensor 308 is displayed on the display unit 317. In the case where the depression of the moving image capturing switch 316 is not detected, the process is repeated.

In the case where the user wants to capture a still image while capturing a moving image, the user depresses the release switch 312. Upon detecting that the release switch is depressed while capturing a moving image (step S104), the control unit 311 stops capturing a moving image (step S105).

Next, the control unit 311 obtains the aspect ratio of the moving image from the nonvolatile memory 314 (step S106) and captures a still image while setting the aspect ratio to the moving image (step S107), regardless of the aspect ratio of the still image. In capturing the still image, the control unit 311 switches the image sensor 308 to a capturing mode appropriate for taking a still image. After the still image is captured, the control unit 311 records the captured image as a still image file in the memory 310 (step S108).

In addition, the control unit 311 inserts the still image captured in step S107 into the portion where the moving image was blacked out, i.e., into the frames between the time the capturing of the still image is started and ended (step S111).

By the above process, a moving image as shown in FIG. 4 is obtained. After the file is recorded and the inserting process is finished, the control unit 311 returns the process to the capturing of a moving image (S103) and restarts the process.

In the case where the depression of the release switch 312 is not detected in step S104 (NO in step S104), the control unit 311 proceeds the process to step S109. The user can end the capturing of a moving image by operating the capturing switch 316 for the moving image while capturing the moving image. When the control unit 311 detects that the switch 316 is operated (YES in step S109), the capturing of a moving image is ended (step S110), and the capturing process is finished. If the operating on the moving image capturing switch 316 is not detected in step S109, the control unit 311 returns the process to step S103 and continues to capture the moving image.

If the capturing of a still image is instructed, i.e., the release switch 312 is depressed, when a moving image is not being captured, the still image is captured while setting an aspect ratio of the still image.

In order to improve user-friendliness, the control unit 311 can perform control to warn a user that a still image will be captured in an aspect ratio of the moving image. The control unit 311 can give such warning by displaying an icon or a message on the viewfinder, or by using an LED display or a warning beep.

Figure 8:
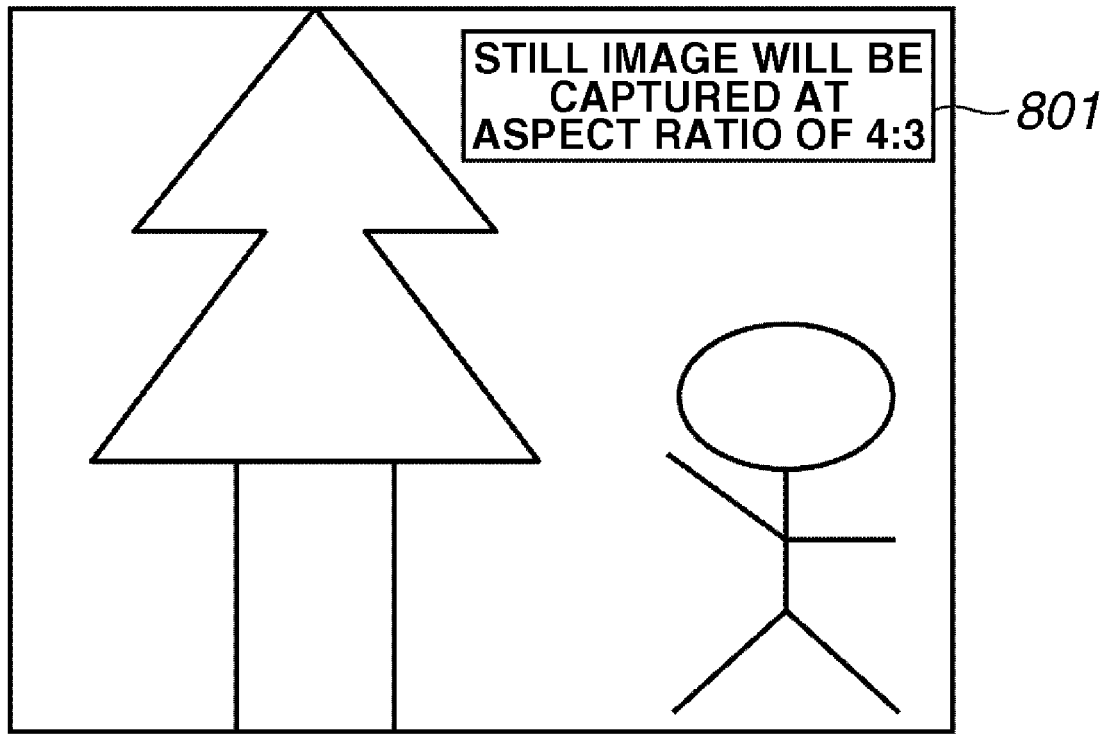
FIG. 8 illustrates a warning icon according to the first exemplary embodiment in the present invention.

For example, in the case where different aspect ratios are set for a moving image and a still image, the control unit 311 can display a screen as shown in FIG. 8 while the moving image is captured. A warning icon 801 notifies the user that the still image will be captured at 4:3 aspect ratio. The warning icon can be displayed when the control unit 311 detects that the release switch 312 is depressed or depressed halfway. Further, instead of displaying a screen as shown in FIG. 8, the control unit 311 can notify the user that the still image has been captured in a different aspect ratio from the previously set aspect ratio, after the still image is captured. Furthermore, the control unit 311 can warn a user by display or sound if the number of pixels and the compression rate of the image will be constrained by the change in the aspect ratio.

As described above, according to the present exemplary embodiment, an imaging apparatus captures a still image while capturing a moving image by setting an aspect ratio of the moving image. The captured still image is inserted into the moving image to complement the moving image. By such a configuration, a user can capture a still image in an appropriate aspect ratio while capturing a moving image without having to switch the aspect ratio setting of the still image. In addition, a user can view the moving image without viewing anomalies even where the still image is captured.

Second Exemplary Embodiment

The first exemplary embodiment described a process of capturing a still image by setting an aspect ratio for recording a moving image in the case where the still image is captured while capturing the moving image. However, in this case, since the aspect ratio of a still image captured while capturing a moving image is automatically changed to 4:3, it is possible that a user who has set the aspect ratio of a still image to 16:9, cannot obtain the desired image.

In the second exemplary embodiment, a process of capturing a still image will be described in which an aspect ratio for a still image is set even while capturing a moving image. The description of the parts in common with the first exemplary embodiment will be omitted, and the part unique to the second exemplary embodiment will be described.

According to the present exemplary embodiment, an imaging apparatus sets an aspect ratio which encompasses both the still image and the moving image in capturing the still image while capturing a moving image. That is, the captured still image is processed as a still image file, or a still image is created which is adjusted to the aspect ratio of the moving image and inserted into the moving image. By such a process, the moving image can be reproduced without feeling any unnaturalness in the portion where the still image is inserted. In addition, a user can obtain a still image with the desired aspect ratio. The case will be described below where the aspect ratio of the moving image is 4:3 and the still image is 16:9.

Figure 9A:
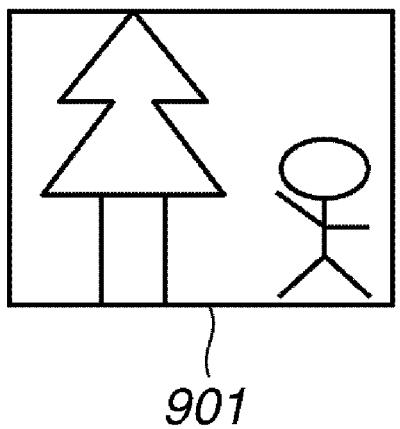
FIG. 9A to 9D illustrate example processing of the still image according to a second exemplary embodiment in the present invention.
Figure 9B:
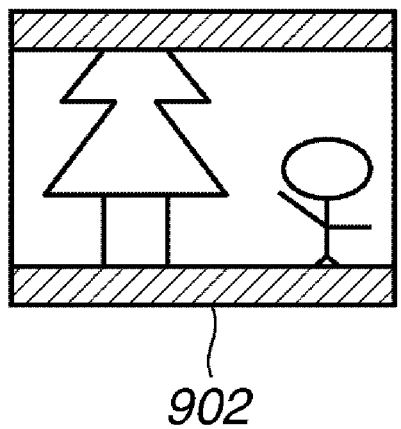

When the imaging apparatus captures a still image in 4:3 aspect ratio, an image 901 as shown in FIG. 9A is obtained. The imaging apparatus deletes the upper part and the lower part of the image and converts it to a 16:9 image 902 (FIG. 9B) so that the image can be recorded as a 16:9 file. The image can also be converted to a 16:9 image if the imaging apparatus processes an image to perform variation.

Figure 9C:
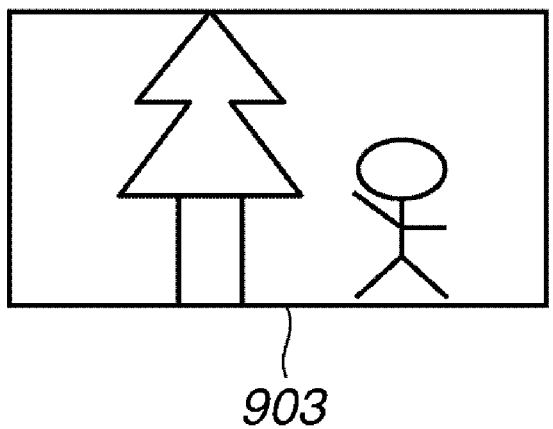
Figure 9D:
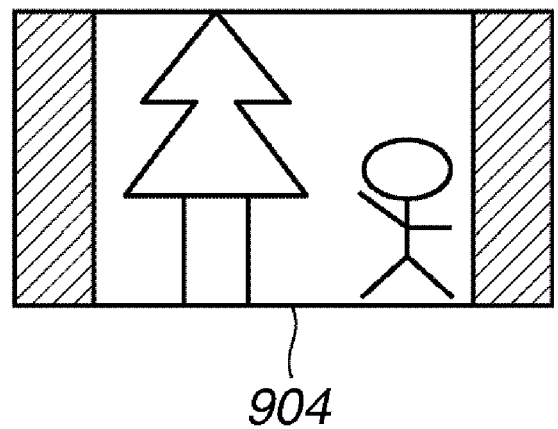

In the case where an image sensor corresponding to capturing in 16:9 aspect ratio is used, an image 903 as shown in FIG. 9C is captured. The image can be converted to a 4:3 image 904 (FIG. 9D) if the imaging apparatus deletes the left and right sides of the 16:9 image. The image can also be converted to a 4:3 image if the imaging apparatus processes an image to perform variation.

By the methods described above, a still image file can be created in an aspect ratio set for the still image or in an aspect ratio set for a moving image, from the captured still image. Therefore, in the case of recording a captured image as a still image file, the imaging apparatus records the image according to the aspect ratio of the still image. In the case of inserting the captured image into the moving image, the imaging apparatus inserts a still image created according to the aspect ratio of the moving image.

Figure 10:
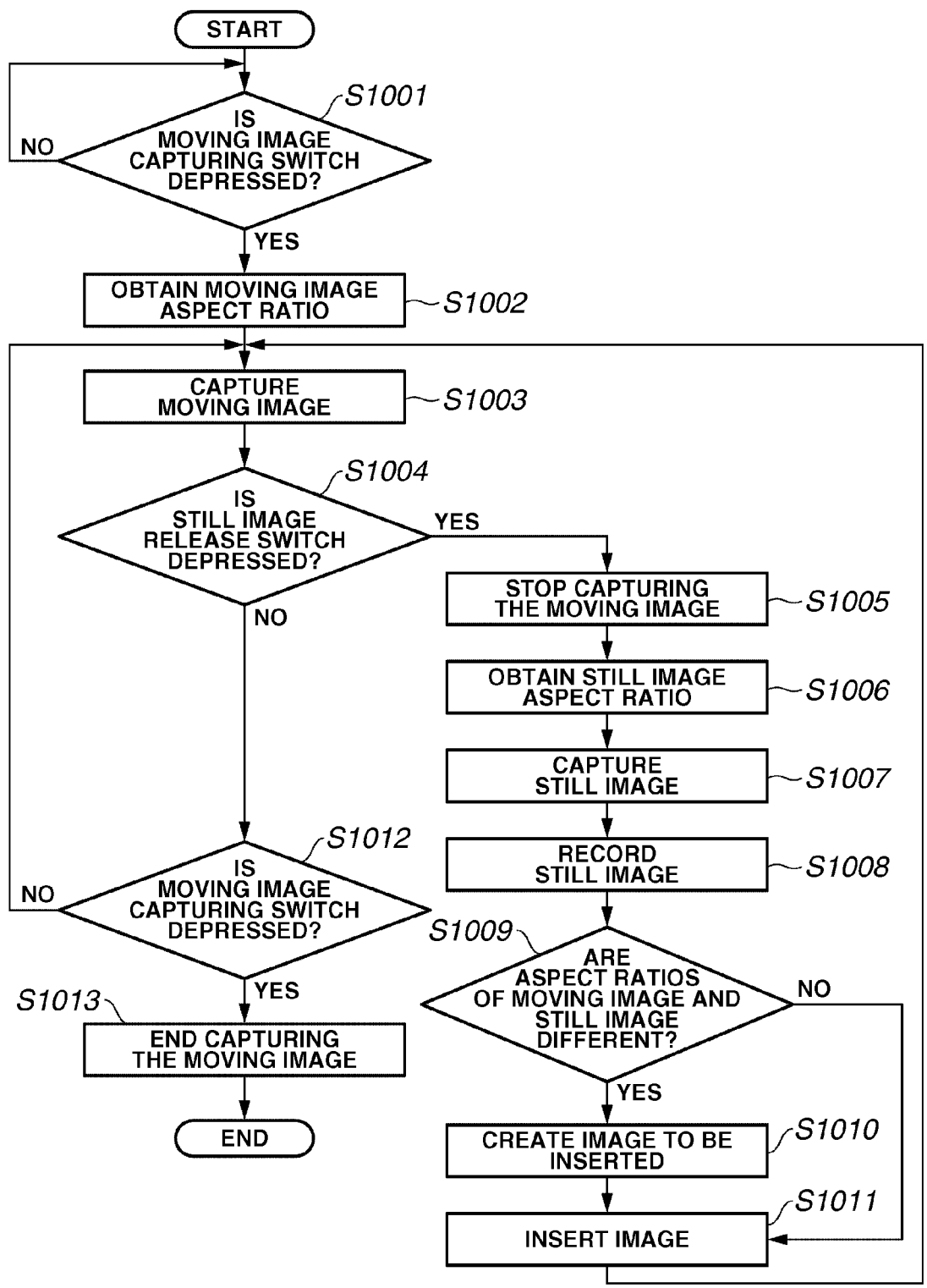
FIG. 10 is a flowchart of the example process according to a second exemplary embodiment in the present invention.

FIG. 10 is a flowchart of an example process in the present exemplary embodiment. Since steps S1001 to S1005, S1012, and S1013 are the same as steps S101 to S105, S109, and S110 in the first exemplary embodiment, description on these steps will be omitted.

The control unit 311 obtains an aspect ratio of a still image from the nonvolatile memory 314 (step S1006). The control unit 311 then captures a still image while setting the aspect ratio of the still image to the image (step S1007), and records the captured image as a still image file in the memory 310 (step S1008).

Next, the control unit 311 determines whether the aspect ratios of the moving image and the still image obtained in steps S1002 and S1006 are different (S1009). If the control unit 311 determines that the aspect ratios are not different, i.e., the same aspect ratios are set, the control unit 311 inserts the still image captured in step S1007 into the moving image (S1011).

On the other hand, in the case where the control unit 311 determines that the aspect ratios of the moving image and the still image are different, the control unit 311 creates an image that is inserted into the moving image (step S1010). The image to be inserted is created using the still image obtained in step S1007 and has the same aspect ratio as the moving image. The image to be inserted can also be created by reading out the image recorded in step S1008 from the memory 310.

The control unit 311 inserts the image created in step S1010 into the moving image (step S1011). After inserting the image, the control unit 311 returns the process to step S1003 and restarts capturing of the moving image.

Other Exemplary Embodiments

In the present embodiment, the control unit 311 captures a still image while setting an aspect ratio of the still image and creates a still image to be inserted using the captured still image. However, the exemplary embodiment of the present invention is not limited to the above. The control unit 311 can capture a still image in an aspect ratio of a moving image and convert the captured still image into an image of an aspect ratio originally set for a still image. In such a case, the captured image becomes the image to be inserted, and the converted image is recorded as a still image file.

In addition, more than one still image file can be stored in the memory 310. A plurality of files with different aspect ratios can be created and recorded. Furthermore, the control unit 311 can allow a user to select the aspect ratio in generating a file.

Moreover, when a user can select an aspect ratio of the still image to be captured while capturing a moving image, the still image can be displayed for the user to review. The image can be displayed in the same aspect ratio as the moving image or as the still image, or the image can be reduced in size so that the images can be displayed in both aspect ratios. The user can select the display method, for example, by using a menu.

In the present exemplary embodiment, an imaging apparatus creates a still image file according to the aspect ratio of the still image. The imaging apparatus converts the still image according to the aspect ratio of the moving image and inserts the image between the frames to complement the moving image. By such a configuration, a user can capture a still image at the desired aspect ratio while capturing a moving image by setting the aspect ratio of the still image at a desired value. In addition, the reproduced moving image will not cause the user to feel any unnaturalness.

The present invention can also be achieved by providing a storage medium which stores software (program code) for realizing the operations of the above-described exemplary embodiments, to a system or an apparatus. Operating the various devices according to the program stored in the computer (CPU or micro-processing unit (MPU)) of the system or the apparatus is also included in the scope of the present invention.

In the above case, the software (program code) itself realizes the operations of the embodiments. Such programs can take any form, for example, object code, a program executed by an interpreter, or script data supplied to an OS. The storage medium can be, for example, a flexible disk, hard disk, optical disk, magnetic optical disk, CD-ROM, CD-R, CD-RW, DVD-ROM, DVD-RAM, DVD-RW, DVD+RW, magnetic tape, nonvolatile memory card, ROM, or digital versatile disk (DVD). Such programs can also be supplied by the system or the apparatus accessing a network and downloaded.

Furthermore, the above embodiments are realized by executing the program codes which are read by a CPU. The present invention includes a case where an OS (operating system) or the like working on the computer performs a part or entire processes in accordance with designations of the program codes and realizes functions according to the above embodiments.

Furthermore, the supplied program code can be stored in a memory equipped in a function enhancement board of the computer or a function enhancement unit connected to the computer, and a CPU in the function enhancement board or the function enhancement unit can execute all or part of the processing based on the instructions of the program code to realize the operations of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-039571 filed Feb. 16, 2006, which is hereby incorporated by reference herein in its entirety.

What is claimed:

1. An imaging apparatus, comprising:
   a still image aspect ratio setting unit configured to set a set still image aspect ratio of a still image to be shot;

a moving image aspect ratio setting unit configured to set a set moving image aspect ratio of a moving image to be shot;

an instructing unit configured to instruct a capturing of a still image during a capturing of a moving image;

a capturing unit configured to capture a still image according to the set still image aspect ratio while capturing a still image and capture a moving image according to the set moving image aspect ratio while capturing a moving image, wherein, while capturing a moving image as a captured moving image and in a case where the instructing unit instructs the capturing of a still image during the capturing of the moving image, the capturing unit captures the still image as a captured still image, according to the set still image aspect ratio and does not capture the still image, according to the set moving image aspect ratio, even if the set still image aspect ratio and set the moving image aspect ratio are not the same;

a determining unit configured to determine whether a captured still image aspect ratio of the captured still image and a captured moving image aspect ratio of the captured moving image are the same; and an inserting unit configured to insert a captured still image into a missing part of a moving image caused by the capturing of the captured still image according to an instruction of the instructing unit, wherein in a case where the determining unit determines that the captured still image aspect ratio and the captured moving image aspect ratio are the same, the inserting unit inserts the captured still image utilizing the set still image aspect ratio, and in a case where the determining unit determines that the captured still image aspect ratio and the captured moving image aspect ratio are not the same, the inserting unit inserts a missing part still image utilizing the set moving image aspect ratio and does not insert the captured still image utilizing the set still image aspect ratio.

2. The imaging apparatus according to claim 1, further comprising an image creating unit configured to create, from a captured still image that is captured on the basis of the still image aspect ratio according to an instruction from the instructing unit, a missing part still image having the set moving image aspect ratio, wherein when the determining unit determines that the captured still image aspect ratio and the captured moving image aspect ratio are not the same, the inserting unit inserts the missing part image created by the creating unit into the captured moving image.

3. The imaging apparatus according to claim 2, further comprising a file generating unit configured to generate a still image file from a still image that is captured according to an instruction from the instructing unit, wherein the file generating unit generates a still image file according to the set still image aspect ratio.

4. The imaging apparatus according to claim 1, further comprising a file generating unit configured to generate a still image file from a still image that is captured according to an instruction from the instructing unit, wherein the file generating unit generates a first still image file according to the set still image aspect ratio and a second still image file according to the set moving image aspect ratio.

5. The imaging apparatus according to claim 1, wherein, when the determining unit determines that the captured still image aspect ratio and the captured moving image aspect ratio are not the same, the inserting unit creates the missing part still image by converting the captured still image from a still image having the set still image aspect ratio into a still image having the set moving image aspect ratio according to the instruction from the instructing unit.

6. The imaging apparatus according to claim 1, wherein, in a case where the determining unit determines that the captured still image aspect ratio and the captured moving image aspect ratio are not the same, the inserting unit performs a masking process to the captured still image that was shot at the set still image aspect ratio to generate the missing part still image having a set moving image aspect ratio, and inserts the generated missing part still image into the captured moving image according to the instruction from the instructing unit.

7. An imaging apparatus, comprising:

a still image aspect ratio setting unit configured to set a still image aspect ratio;

a moving image aspect ratio setting unit configured to set a moving image aspect ratio;

an instructing unit configured to instruct a capturing of a still image during a capturing moving image;

a capturing unit configured to capture a still image according to the still image aspect ratio set by the still image aspect ratio setting unit while capturing a still image and capture a moving image according to the moving image aspect ratio set by the moving image aspect ratio setting unit, wherein, in a case where the instructing unit instructs a capturing of a still image during a capturing of moving image, the capturing unit captures a still image according to the still image aspect ratio and does not capture the still image according to moving image aspect ratio, even if the still image aspect ratio and the moving image aspect ratio are not the same; and an insert unit configured, in the case where the instructing unit instructs a capturing of a still image during a capturing of moving image, to insert the still image captured by the capturing unit into a missing part of the moving image captured by the capturing unit, wherein in a case where the still image aspect ratio and the moving image aspect ratio are the same, the inserting unit inserts the still image captured utilizing the still image aspect ratio, and in a case where the still image aspect ratio and the moving image aspect ratio are not the same, the inserting unit inserts into the missing part a still image utilizing the moving image aspect ratio and does not insert the still image captured utilizing the still image aspect ratio.

* * * * *